United States Patent [19]

Putz

[11] Patent Number: 5,251,360
[45] Date of Patent: Oct. 12, 1993

[54] SEAL RETAINING CLAMPING APPARATUS

[76] Inventor: Raymond J. Putz, 37159 Golfview, Sterling Heights, Mich. 48312

[21] Appl. No.: 925,956
[22] Filed: Aug. 5, 1992
[51] Int. Cl.[5] .............................................. F16L 33/02
[52] U.S. Cl. ................................. 24/20 R; 24/20 CW
[58] Field of Search ............ 24/20 R, 20 CW, 20 EE, 24/20 TT, 30.5 W, 23 W

[56] References Cited

U.S. PATENT DOCUMENTS 4,724,583  2/1988  Ojima ................................. 27/20 R

FOREIGN PATENT DOCUMENTS 1046710  10/1966  United Kingdom ........... 24/20 CW

Primary Examiner—James R. Brittain
Attorney, Agent, or Firm—William J. Clemens

[57] ABSTRACT

An apparatus for clamping a tubular object includes an elongated band having an outer surface, an inner surface, a free end and an opposite end. An open ended slot is formed at the free end and a tightening ear is formed adjacent the opposite end of the band. A step is formed between the tightening ear and the free end with a first tongue for cooperating with the slot. A second tongue is formed at the opposite end and the clamping apparatus is assembled by overlapping the free end with the opposite end and fixedly attaching the second tongue to the outer surface of the band. The assembled band extends in a continuous ring with the first tongue received in the slot to form the inner surface into a substantially gap-free surface for contacting the tubular object encircled by the clamping apparatus when the tightening ear is deformed to reduce the diameter of the ring.

13 Claims, 1 Drawing Sheet

SEAL RETAINING CLAMPING APPARATUS

BACKGROUND OF THE INVENTION

The present invention relates generally to an apparatus for clamping tubular objects and, in particular, to an apparatus for retaining a seal between a hose and a rigid nipple.

A metal clamping band is shown in the U.S. Pat. No. Re. 26,211. The clamping band is formed of a ductile material such as steel and the ends of the band are connected together to form a ring. An integral clamping and tensioning loop is formed on the band being of keystone shape defined by two straight sides of substantially equal length folded back relative to their adjacent band portions so as to define inner fold junctions. The inner fold junctions extend parallel to one another transversely over the width of the band in spaced apart relation and a substantially flat connecting bridge portion extends between parallel outer ends of the straight sides and defines outer fold junctions therewith. The bridge portion has a length between the outer ends on the straight sides that is at least approximately twice the length of the straight sides and the inner ends of the side portions are movable toward one another and the bridge portion is movable toward the band portion to effect tensioning of the band portion. The inner and outer fold junctions are abrupt, acute, angle folds of relatively small fillet radii when the clamping band is in the tensioned condition.

U.S. Pat. No. 4,299,012 shows a hose clamp having open ends adapted to be mechanically interconnected by outwardly extending hooks in an inner band portion operable to engage in corresponding apertures provided in an outer band portion. At least one plastically deformable ear is provided in the clamp structure for tightening the clamping band about an object to be fastened by a plastic deformation of the ear. A substantially gap-free transition in the circumferential direction from the inner band portion to the ring-like configuration of the clamp structure defined by the clamping band is obtained by the use of a tongue-like extension at the free end of the inner band portion which is operable to engage into a tongue-receiving aperture or channel provided in the outer band portion.

U.S. Pat. No. 4,823,442 shows a hose clamp having an elongated strip and a clasp. The strip has a projecting member for enabling positioning of the clasp upon the strip and barbed members are formed on the longitudinal edges of the strip to enable locking of the strip within the clasp. The clasp includes finger members projecting therefrom to sandwich the strip between the clasp finger members and the strip projecting member to lock the strip's barbs against the clasp's barbs to retain the strip in the clasp when the strip is in a use position.

U.S. Pat. No. 5,052,082 discloses a clamping system for clamping a member onto a cylindrically-shaped surface wherein the member to be clamped has a first annular groove provided in the region which is to be clamped and a second annular groove provided in the bottom of the first annular groove. A clamping band has a body portion received in the first annular groove, a tongue received in the second annular groove, hooks for connecting the opposite ends of the body portion to each other to lock the clamping band in the first and second annular grooves, and a plastically deformable ear to tighten the clamping band about the member.

SUMMARY OF THE INVENTION

The present invention concerns an apparatus for clamping a tubular object such as sealing a flexible hose to a rigid metal nipple. The clamping apparatus includes an elongated band means having an outer surface, an inner surface, a free end and an opposite end. A means for receiving a tongue-like means, such as an open ended slot, is formed in the free end of the band. A means for tightening the clamping apparatus about the object is formed as a deformable ear adjacent the opposite end of the band. A step is formed between the ear and the free end such that the outer surface of that portion of the band on one side of the step is in the same plane as the inner surface of that portion of the band on the other side of the step.

A first tongue-like means is formed at the step between a pair of longitudinally extending slits and a second tongue-like means is formed at the opposite end of the band. The clamping apparatus is assembled by positioning the opposite end overlapping the free end and fixedly attaching the second tongue-like means to the outer surface to form a continuous ring with the first tongue-like means partially received in the slot to form the inner surface into a substantially gap-free surface for contacting an outer surface of the tubular object. When the object is encircled, the clamping apparatus is tightened by deforming the ear to reduce the diameter of the band.

It is an object of the present invention to maintain a seal between a hose and a nipple when a clamping apparatus is tightened about the hose.

It is another object of the present invention to prevent a clamping tool from disengaging from a deformable ear during the tightening of a clamping apparatus about a tubular object.

It is a further object of the present invention to eliminate assembly steps when a clamping apparatus is installed on a tubular object.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
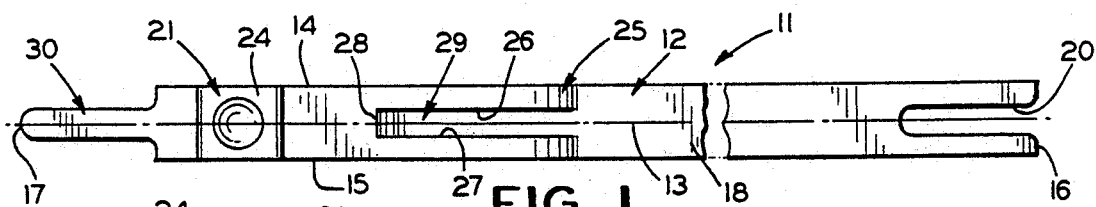
FIG. 1 is a top plan view of a clamping apparatus in accordance with the present invention before assembly.
Figure 2:
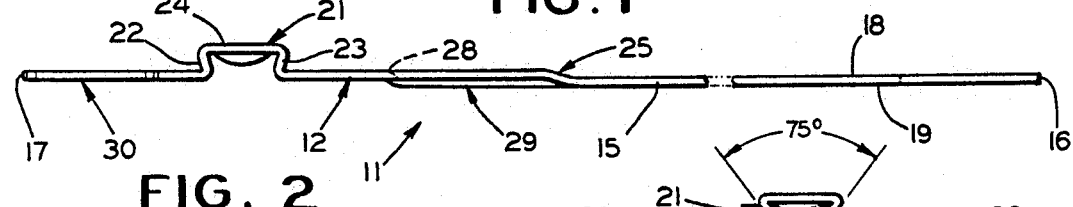
FIG. 2 is a side elevation view of the apparatus shown in the FIG. 1.

There is shown in the FIGS. 1 and 2 a clamping apparatus 11 formed as an elongated band means 12 having a longitudinal axis 13. The band means 12 is in the form of an elongated strip body having opposed side edges 14 and 15, a free end 16 and an opposite end 17.

The band means 12 also has an outer surface 18 and an inner surface 19.

A means for receiving a tongue-like means 20 is formed in the free end 16 of the band means 12. The means for receiving 20 is formed as a slot open at the free end 16 and extending longitudinally a predetermined distance into the band means 12.

Also formed in the band means 12 is a means for tightening 21. The means for tightening 21 is a deformable ear extending outwardly above the outer surface 18 and including a pair of generally radially outwardly extending legs 22 and 23 connected together by a bridge portion 24.

Also formed in the band means 12 is a step 25 located adjacent to and on the opposite side of the means for tightening 21 from the opposite end 17. As best shown in the FIG. 2, the step 25 extends inwardly a distance equal to the thickness of the band means 12. Thus, the outer surface 18 of that portion of the band means 12 to the right of the step 25 is in the same horizontal plane with the inner surface 19 of that portion of the band means 12 to the left of the step 25. A pair of slits 26 and 27 are formed on opposite sides of the longitudinal axis 13 and extend from the step 25 a predetermined distance toward the means for tightening 21 to a termination point 28. A portion of the band means 12 bounded by the step 25, the slits 26 and 27 and the termination point 28 is depressed below the outer surface 18 to extend in the same horizontal plane as that portion of the band means 12 extending to the right of the step 25. This depressed portion of the band means 12 forms a first tongue-like means 29.

Figure 3:
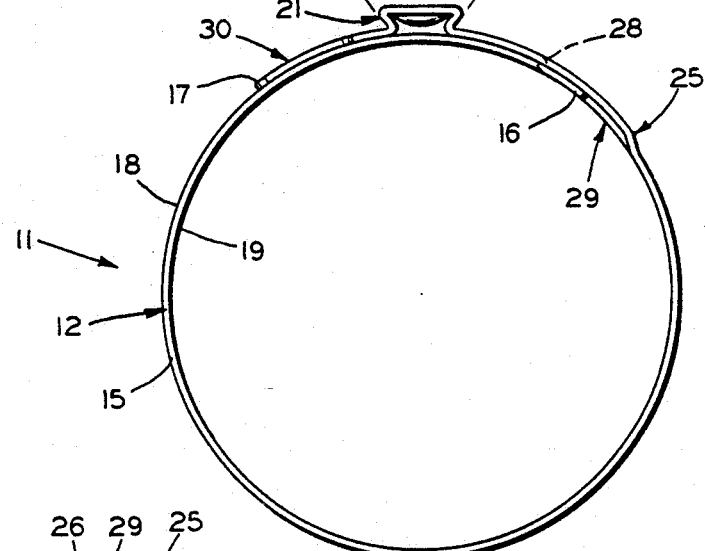
FIG. 3 is a side elevation view of the apparatus shown in the FIG. 1 after assembly.
Figure 4:
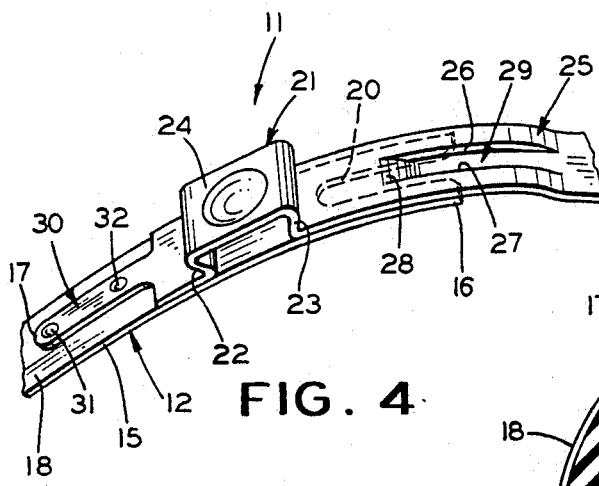
FIG. 4 is an enlarged fragmentary perspective view of the apparatus shown in the FIG. 3.

A second tongue-like means 30 is formed as a narrow portion of the band means 12 extending in a longitudinal direction from the opposite end 17 a predetermined distance toward the means for tightening 21. As shown in the FIG. 3, the band means 12 is bent into a ring shape wherein the opposite end 17 overlaps the free end 16. The second tongue-like means 30 is fixedly attached to the outer surface 18 to maintain the clamping apparatus 11 in its ring-like configuration. The second tongue-like means 30 can be attached to the outer surface 18 by any suitable means such as by projection welding at a pair of welding points 31 and 32 shown in the FIG. 4. Also shown in the FIG. 4 is the first tongue-like means 29 cooperating with the means for receiving 20. A portion of the first tongue-like means 29 adjacent to the point 28 extends into the opening of the slot 20 at the free end 16. As best shown in the FIG. 3, the means for receiving 20 and the first tongue-like means 29 cooperate to form a continuous ring with a substantially gap-free inner surface 19. As will be discussed below, this substantially gap-free inner surface enables the clamping apparatus 11 to retain a seal when used to clamp a hose made from a flexible material.

The diameter of the clamping apparatus 11 at the inner surface 19 is larger than an outer diameter of a hose to be clamped thereby facilitating installation. As shown in the FIG. 4, the legs 22 and 23 extend inwardly from opposite ends of the bridge portion 24. The legs 22 and 23 are also angled toward one another such that the inner ends of the legs 22 and 23 are closer together than the outer ends of the legs 22 and 23. Preferably, the angle defined by the legs is approximately 75°. This configuration of the means for tightening 21 enables an installer to engage the legs 22 and 23 with opposed jaws of a tool (not shown). The tool is operated to move the jaws towards one another thereby deforming the means for tightening 21 and reducing the diameter of the clamping apparatus 11 to tighten the clamping apparatus about a hose or the like. The angled legs 22 and 23 prevent the jaws of the tool from slipping from the means for tightening 21 as was the case with many prior art clamping structures.

Figure 5:
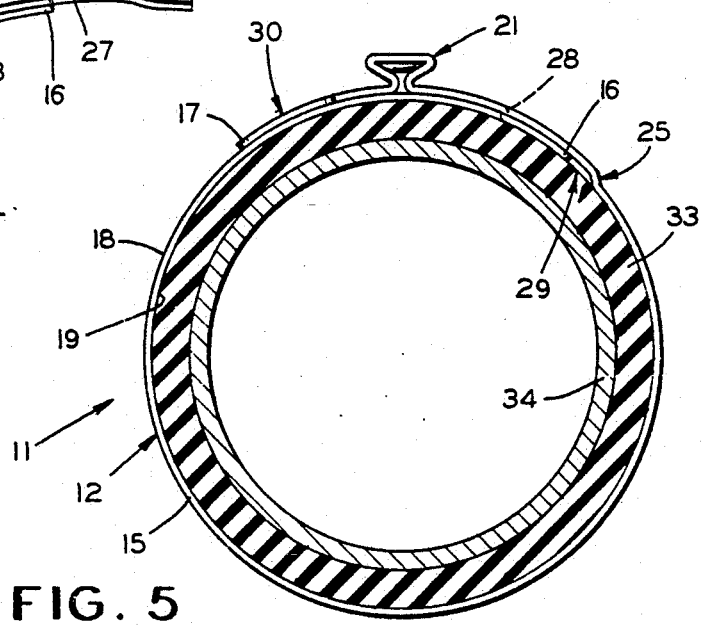
FIG. 5 is a side elevation view of the apparatus shown in the FIG. 3 after installation on an object to be clamped.

As shown in the FIG. 5, the clamping apparatus 11 encircles an object to be clamped such as a hose 33 formed of an elastic material such as plastic or rubber. Typically, an open end of the hose 33 receives an end of a inlet or outlet nipple 34 which is formed of a metal material. In order to effect a seal between the exterior surface of the nipple 34 and the interior surface of the hose 33, the clamping apparatus 11 is tightened by reducing the diameter thereof. Since the second tongue-like means 30 is fixedly attached to the outer surface 18 of the band means 12, the moving together of the legs 22 and 23 will pull the first tongue-like means 29 farther into the means for receiving 20. As stated above, the first tongue-like means 29 and the means for receiving 20 cooperate to form the inner surface 19 into a substantially gap-free surface for contacting the outer surface of the hose 33. This substantially gap-free contact prevents the material of the hose 33 from bunching thereby retaining the seal between the inner surface of the hose surface 33 and the outer surface of the nipple 34. The substantially gap-free inner surface 19 maintains a constant radial tension on the hose 33.

For use in motor vehicle application, the band means 12 can be formed from a strip of suitable material such as 304 stainless steel having a thickness of 0.039 inches and a width of 0.394 inches. The slot 20 can be 0.154 inches wide and 0.752 inches long. The first tongue 29 can be 0.154 inches wide with a predetermined length determined by a 0.805 inch distance between the point 28 and the beginning of the step 25. The ear 21 can be formed 0.472 inches wide at the bridge portion 24 and the point 28 can be 0.587 inches from the leg 23. The legs 22 and 23 can be 0.178 inches long and, as stated above, define a 75° angle. The first tongue 29 can be depressed below the outer surface 18 0.039 inches which is the thickness of the material. The second tongue 30 can be 0.154 inches wide and 0.752 inches long to enable nesting with a slot in an adjacent band means thereby permitting a plurality of the band means 12 to be formed in a continuous process from a roll of strip stock. The diameter of the inner surface 19 when the clamping apparatus is assembled can be 3.496 inches which diameter is reduced to 3.434 inches when the ear 21 is deformed, such as by crimping, upon installation on the hose 33.

In summary, the clamping apparatus according to the present invention includes an elongated band means having an outer surface, an inner surface, a free end, an opposite end and a longitudinal axis. A means for receiving a tongue-like means, such as an open ended slot, is formed in the free end and a means for tightening the clamp structure about a tubular object, such as a deformable ear, is formed adjacent the opposite end. A step is formed between the means for tightening and the free end such that, before assembly, the outer surface of that portion of the band means between the step and the free end is in the same plane as the inner surface of that portion of the band means between the step and the opposite end. A first tongue-like means is formed at the step and a second tongue-like means is formed at the opposite end.

The clamping apparatus is assembled by positioning the opposite end over the free end and fixedly attaching the second tongue-like means to the outer surface of the band means to form a continuous ring with the first tongue-like means received in the means for receiving to form said inner surface into a substantially gap-free surface for contacting a tubular object encircled by the clamping apparatus. Thus, when the clamping apparatus is tightened about a hose installed on a nipple by deforming the ear, the seal between the hose and the nipple is retained. Furthermore, the deformable ear is shaped to prevent a crimping tool from disengaging from the ear during the tightening of the clamping apparatus about a tubular object. Also, the attachment of the second tongue-like means to the outer surface of the band eliminates assembly steps when the clamping apparatus is installed on a tubular object.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A clamping apparatus comprising:
   band means having an outer surface, an inner surface, a free end, and an opposite end;
   a means for receiving a tongue-like means formed in said free end;
   a means for tightening the clamping apparatus about an object formed adjacent said opposite end;
   a step formed between said means for tightening and said free end;
   a first tongue-like means formed at said step; and
   a second tongue-like means formed at said opposite end wherein said opposite end overlaps said free end and said second tongue-like means is fixedly attached to said outer surface to form a continuous ring with said first tongue-like means received in said means for receiving to form said inner surface into a substantially gap-free surface for contacting an object encircled by the clamping apparatus when the clamping apparatus is tightened about the object by said means for tightening, and said second tongue-like means and said means for receiving are substantially similar in size and shape.

2. The clamping apparatus according to claim 1 wherein said means for receiving is a slot open at said free end and extending along a longitudinal axis of said band means.

3. The clamping apparatus according to claim 1 wherein said means for tightening is an ear formed integral with said band means and having a pair of spaced apart generally radially outwardly extending legs connected by a bridge portion.

4. The clamping apparatus according to claim 3 wherein said legs extend outwardly at an approximate 75° angle to one another.

5. The clamping apparatus according to claim 3 wherein said step positions a portion of said band means between said step and said free end radially inwardly by a distance equal to a thickness of said band means when compared to a portion of said band means between said step and said opposite end.

6. The clamping apparatus according to claim 1 wherein said first tongue-like means extends longitudinally between said step and a point adjacent said means for tightening and extends transversely between a pair of generally parallel slits formed in said band means.

7. The clamping apparatus according to claim 6 wherein said first tongue-like means is depressed below said outer surface.

8. The clamping apparatus according to claim 1 wherein said second tongue-like means is welded to said outer surface.

9. A clamping apparatus for retaining a seal between tubular objects comprising:
   an elongated band having an outer surface, an inner surface, a free end, an opposite end and a longitudinal axis;
   an open ended slot formed along said longitudinal axis in said free end;
   a deformable ear formed in said band adjacent said opposite end;
   a step formed in said band between said deformable ear and said free end;
   a first tongue formed along said longitudinal axis in said band at said step; and
   a second tongue formed along said longitudinal axis in said band at said opposite end, wherein said opposite end overlaps said free end and said second tongue is fixedly attached to said outer surface to form a continuous ring with said first tongue received in said slot to form said inner surface into a substantially gap-free surface for contacting a tubular object encircled by the clamping apparatus when the clamping apparatus is tightened about the tubular object by deforming said deformable ear, and said second tongue and said open ended slot are substantially similar in size and shape.

10. The clamping apparatus according to claim 9 wherein said deformable ear is formed integral with said band and has a pair of spaced apart generally radially outwardly extending legs connected by a bridge portion.

11. The clamping apparatus according to claim 10 wherein said legs extend outwardly at an approximate 75° angle to one another.

12. The clamping apparatus according to claim 9 wherein said step positions a portion of said band between said step and said free end radially inwardly by a distance equal to a thickness of said band when compared to a portion of said band between said step and said opposite end and wherein said first tongue extends longitudinally between said step and a point adjacent said deformable ear and extends transversely between a pair of generally parallel slits formed in said band, said first tongue being depressed below said outer surface.

13. A clamping apparatus for retaining a seal between tubular objects comprising:
    an elongated band having an outer surface, an inner surface, a free end, an opposite end and a longitudinal axis;
    an open ended slot formed along said longitudinal axis in said free end;
    a deformable ear formed in said band adjacent said opposite end, said deformable ear being formed integral with said band and having a pair of spaced apart generally radially outwardly extending legs connected by a bridge portion, said legs extending at an approximate 75° angle to one another;
    a step formed in said band between said deformable ear and said free end, said step positioning a portion of said band between said step and said free end radially inwardly by a distance equal to a thickness of said band when compared to a portion of said band between said step and said opposite end;

a first tongue formed along said longitudinal axis in said band at said step, said first tongue extending longitudinally between said step and a point adjacent said deformable ear and extending transversely between a pair of generally parallel slits formed in said band, said first tongue being depressed below said outer surface; and a second tongue formed along said longitudinal axis in said band at said opposite end, wherein said opposite end overlaps said free end and said second tongue is fixedly attached to said outer surface to form a continuous ring with said first tongue received in said slot to form said inner surface into a substantially gap-free surface for contacting a tubular object encircled by the clamping apparatus when the clamping apparatus is tightened about the tubular object by deforming said deformable ear, and said second tongue and said open ended slot are substantially similar in size and shape.

* * * * *